(12) United States Patent
Brinkley

(10) Patent No.: US 8,366,133 B2
(45) Date of Patent: Feb. 5, 2013

(54) SWITCH HITCH

(76) Inventor: Terry Brinkley, Bluffton, SC (US)

( * ) Notice: Subject to any disclaimer, the term of this patent is extended or adjusted under 35 U.S.C. 154(b) by 61 days.

(21) Appl. No.: 13/096,238

(22) Filed: Apr. 28, 2011

(65) Prior Publication Data

US 2012/0274047 A1  Nov. 1, 2012

(51) Int. Cl.
*B60D 1/07* (2006.01)
(52) U.S. Cl. .................. 280/416.1; 280/415.1; 280/489; 280/511; D12/162
(58) Field of Classification Search ............... 280/416.1, 280/415.1, 489, 511; D12/162
See application file for complete search history.

(56) References Cited

U.S. PATENT DOCUMENTS

| | | | | |
|---|---|---|---|---|
| 3,801,134 A | * | 4/1974 | Dees | ............................ 280/416.1 |
| 4,248,450 A | | 2/1981 | McWethy | |
| 4,729,571 A | | 3/1988 | Tienstra | |
| 5,265,899 A | | 11/1993 | Harrison | |
| 5,322,313 A | | 6/1994 | Schroeder | |
| D356,764 S | | 3/1995 | Thixton, Jr. et al. | |
| 5,725,229 A | | 3/1998 | McWethy | |
| 5,839,744 A | | 11/1998 | Marks | |
| 5,890,727 A | | 4/1999 | May | |
| D409,124 S | * | 5/1999 | Bank | ............................ D12/162 |
| 6,460,870 B2 | | 10/2002 | Moss | |
| 6,974,148 B2 | | 12/2005 | Moss et al. | |
| 7,021,643 B1 | | 4/2006 | Buchanan | |
| 7,044,494 B1 | | 5/2006 | Cowett | |
| D553,058 S | | 10/2007 | Chen et al. | |
| 7,566,067 B1 | * | 7/2009 | Alexander | ................. 280/415.1 |
| 2002/0024194 A1 | * | 2/2002 | Ross | ........................... 280/416.1 |
| 2006/0290098 A1 | * | 12/2006 | Shannon | .................... 280/415.1 |
| 2009/0039619 A1 | | 2/2009 | Gries | |

* cited by examiner

*Primary Examiner* — Tashiana Adams
*Assistant Examiner* — Marlon Arce
(74) *Attorney, Agent, or Firm* — Barnwell Whaley Patterson & Helms, LLC

(57) ABSTRACT

There is provided a tow hitch that includes a shank, an elongated shank having a first end and a second end and a rectangular cross-section having four side surfaces adapted to slideably fit within a receiver located on a towing vehicle. A shank shaft extends outwardly from the second end of the shank a sufficient length to accommodate the tubular shank sleeve. The shank shaft is somewhat smaller that the shank and is sized to accommodate a shank sleeve. The shank shaft may be circular so that the shank sleeve can be rotated around the longitudinal axis of the shank shaft. When in place over the shank shaft the first end shank sleeve abuts the second end of the shank. Tow balls are secured to respective side walls of the shank sleeve. The shank sleeve is retained on the shank shaft by an end cap having a space to receive the outer end of the shank shaft and is held in place by a pin through the top and bottom of the end cap and through the end of the shank shaft. Each tow ball is held in the desired position by a spring loaded indexing plunger.

8 Claims, 3 Drawing Sheets

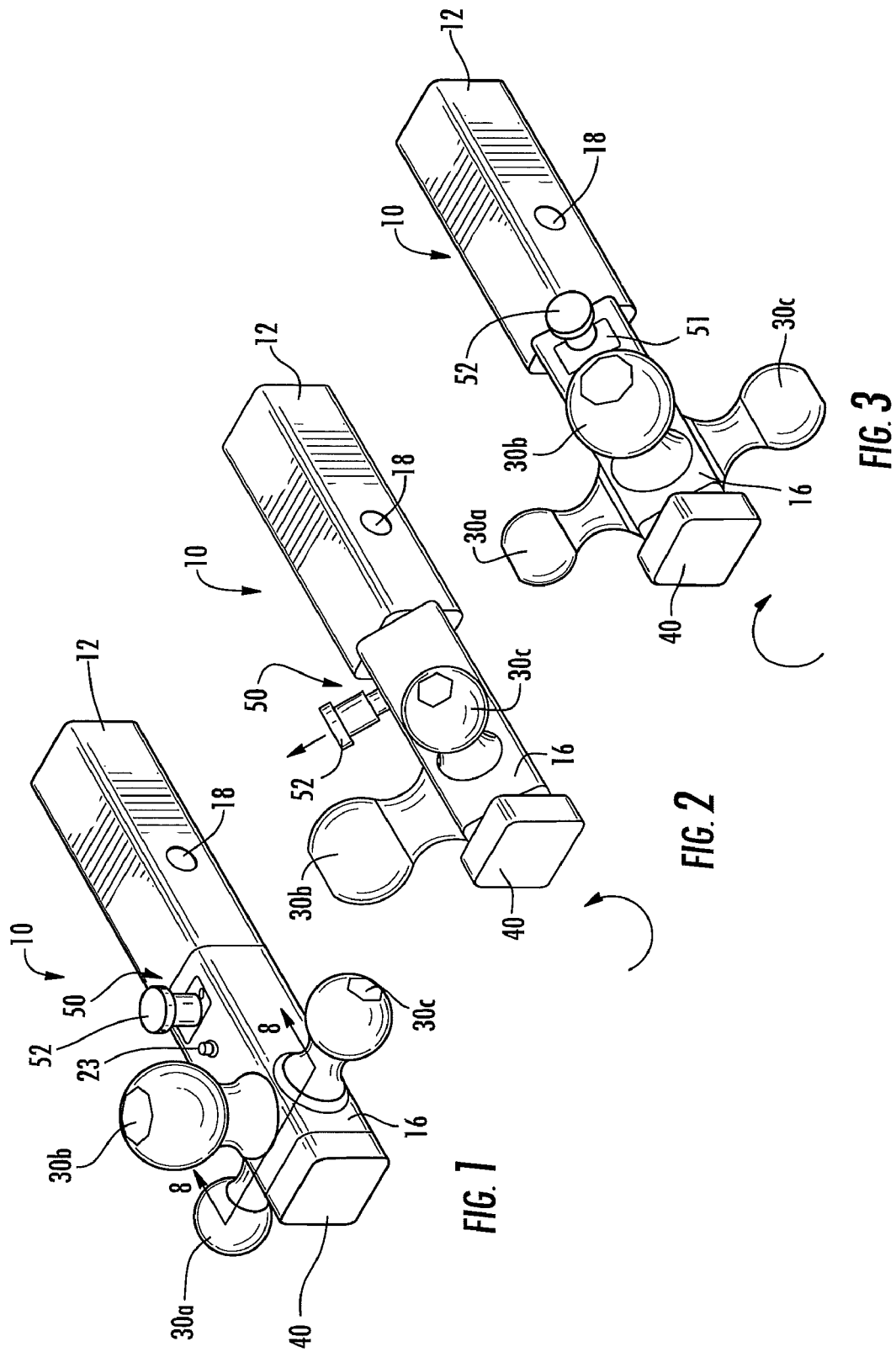

ated by the 
SWITCH HITCH

BACKGROUND OF THE INVENTION

1. Field of the Invention

The present invention relates to multi-ball tow hitches. More particularly, the present invention is directed to a tow hitch having three tow balls that rotate around the longitudinal axis of the tow hitch shank shaft.

2. Description of Related Art

Tow hitches are commonly used for towing one vehicle behind another. When attaching a towing vehicle to a towed vehicle, a hitch is used that includes a tow ball and a couple. Over the years there have been numerous variations of tow hitches. One type of hitch is a receiver hitch. The receiver part of the hitch is what actually attaches to the tow vehicle. The receiver is a large square tube that accepts a shank or trunnion. The receiver tube is securely mounted to the frame of the towing vehicle, such as by bolting or welding to the vehicle chassis. The receiver is reinforced and provided with an opening for receiving one end of the shank of the tow hitch. The shank is smaller in cross-section and slides into the receiver and has the tow ball attached thereto, such as by welding. The shank is secured to the receiver with a pin that slides through both the receiver side walls and the shank and is held securely in place with a clip or lock.

A problem with the single ball tow hitches is that different trailers are desired to be towed behind the same vehicle, and different vehicles frequently have couples that differ in size and shape and thus do not fit or mate with the tow ball attached to the shank of the tow hitch. In order to tow a trailer with a non-matching couple, the tow ball must be removed and replaced with a different size tow ball which causes delay and inconvenience. To overcome some of the difficulties of dealing with different size tow balls, three ball hitches were developed. However, many of these hitches were deficient in one way or another. For instance, the tow balls must be removed from the receiver attached to the towing vehicle. Typically, when the vehicle owner adapts the vehicle for towing, the hitch is furnished with one size tow ball that is suited for the trailer to be towed. It is often the case that a vehicle owner has several different size and weight trailers that must be towed, requiring the vehicle owner to change tow hitches for the different loads that may be encountered during the towing. However, the vehicle owner must remove the shank having the tow ball affixed thereto and exchange it for the correct size. The exchange is sometimes difficult as it sometimes requires tools and other times the parts have rusted causing removal of the shank to be difficult.

Once it is known how much weight will be towed and that the weight does not exceed the maximum towing capacity of the tow vehicle, the proper tow ball may be selected. Tow balls come in several sizes depending upon their load rating. For example a 2 inch diameter ball may have a load rating of 5,000 pounds while a 2⁵⁄₁₆ inch ball may have a load rating of 7,000 pounds. Many pickups and SUVs come factory-equipped with a Class III hitch, which is the most popular class of hitch. Most hitches bolt to the vehicle, and while some are welded, a bolt-on installation is the method preferred for attachment, for hauling any load (car, boat, camper, or whatever) a Class III hitch can handle up to 5,000 pounds. For heavier boats or campers, a Class IV hitch (up to 7,500 pounds) is required.

With the above described deficiencies in mind, the present invention is of great convenience to a vehicle owner to be able to have a tow hitch wherein several different sized tow balls may be easily selected depending on the load rating.

SUMMARY OF THE INVENTION

It is therefore the general object of the present invention to provide a multiple tow ball hitch with a rapid and easy selection of multiple tow ball sizes.

Another object of the present invention is to provide a towing hitch having a rotatable member for the selection of tow ball hitches.

A further object of the present invention is to provide a tow hitch which allows an operator to select the desired tow ball size without removing the hitch from the vehicle.

The tow hitch of the present invention includes a shank, a shank shaft, a tubular shank sleeve having multiple tow balls attached thereto and capable of rotating around the horizontal axis of the shank shaft. The elongated shank or trunnion has a first end and a second end and a rectangular cross-section, preferably a square cross-section, and four side surfaces adapted to slideably fit within a receiver located on a towing vehicle in a comparative snug, supported secure position. The shank has a mounting bore extended therethough for locking the shank to the receiver using any suitable means, such as a lock or clip.

A shank shaft extends outwardly from the second end of the shank a sufficient length to accommodate the tubular shank sleeve. The shank shaft is somewhat smaller that the shank and is sized to accommodate the shank sleeve. The shank shaft may be circular so that the shank sleeve can be rotated around the longitudinal axis of the shank shaft. When in place over the shank shaft, the first end shank sleeve abuts the second end of the shank. Tow balls are secured to respective side walls of the shank sleeve. The shank sleeve is retained on the shank shaft by an end cap having a space to receive the end of the shank shaft, and is held in place by a pin through the top and bottom of the end cap and through the end of the shank shaft. Each tow ball is held in the desired position by a spring loaded indexing plunger.

Other objects, features and advantages of the present invention will become apparent from the following detailed description of the invention taken in conjunction with the accompanying drawings.

BRIEF DESCRIPTION OF THE DRAWINGS

Having described the invention in general terms, reference will now be made to the accompanying drawings, which are not necessarily drawn to scale, and wherein:

FIG. 1 is a perspective view of an embodiment of the tow hitch according to the present invention showing the rotatable ball assembly in a first position;

FIG. 2 is a perspective view of an embodiment of the tow hitch according to the present invention showing the rotatable ball assembly being rotated counterclockwise to a second position;

FIG. 3 is another perspective view of an embodiment of the tow hitch according to the present invention showing the rotatable ball assembly being rotated clockwise to a third position;

DESCRIPTION OF THE PREFERRED EMBODIMENT(S)

Figure 5:
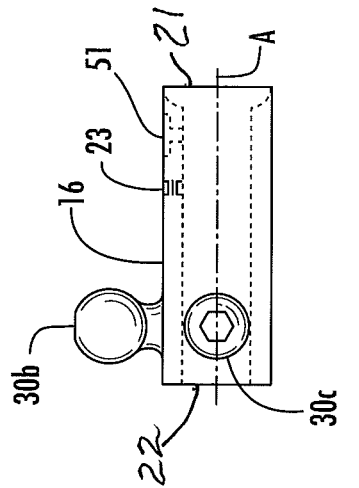
FIG. 5 is a side view of the shank sleeve of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be through and complete and will fully convey the scope of the invention to those skilled in the art. Like numbers refer to the elements throughout.

Referring now to the drawings and in particular FIGS. 1-3, there is shown in FIG. 1 the tow hitch 10 in a first position with a tow ball 30b in position on the upper side of shank sleeve 16. When the vehicle operator wishes to use a different size tow ball, such as tow ball 30c shown in FIG. 2 wherein the shank sleeve 16 is partly rotated, the operator simply pulls the knob 52 of indexing plunder pin 50 outwardly (as shown by the arrow) until the plunger pin is released from a locating hole and rotates the shaft sleeve 16 counter clock wise around the longitudinal axis A of the shank shaft until the tow ball 30c is in an upright position and the locking pin is properly in place when the knob 52 of indexing plunder 50 is released. In a like manner, as shown in FIG. 3, the third tow ball 30a may be engaged by outwardly extending the indexing plunder 50 thus releasing the plunger pin from a locating hole and rotating the shank sleeve 16 in a clockwise direction about its longitudinal axis A until the tow ball 30a is in the upright position and releasing the indexing plunger to set the locating pin in place in the locating hole. The tow hitch allows an operator to select the desired ball size without removing the hitch from the towing vehicle.

The tow hitch 10 of the present invention generally comprises an elongated shank 12, a shank shaft 14, and a tubular shank sleeve 16 having multiple tow balls 30a, 30b, and 30c attached thereto and capable of rotating around the longitudinal axis A of the shank shaft 14.

Figure 4:
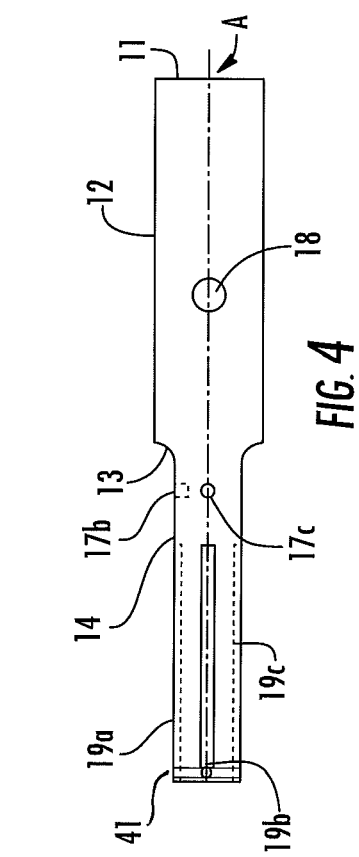
FIG. 4 is a side view of the shank and shank shaft of the tow hitch of the present invention.

As shown in FIG. 4, the elongated shank (or trunnion) 12 has a first end 11 and a second end 13. The shank 12 has a rectangular cross-section, preferably a square cross-section and four side surfaces. The first end 11 of shank 12 is adapted to slideably fit within the receiver (not shown) located on a towing vehicle in a comparative snug, supported position. The receiver typically is a tubular structure having an opening of rectangular cross-section extending therethrough. The receiver is formed as part of a towing vehicle, or is secured to a towing vehicle in a conventionally known fashion. The shank 12 has a mounting bore 18 extended therethough for use in securing the shank 12 to the receiver using any suitable means to slide through the receive and the shank mounting bore 18, such as a clip or a lock.

Figure 8:
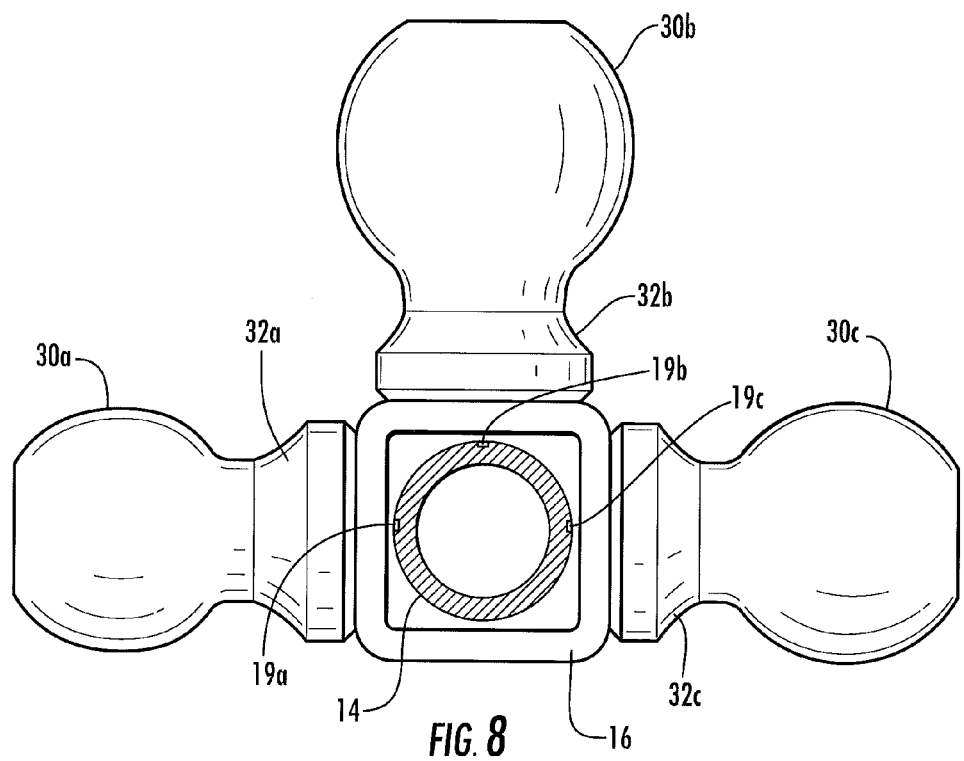
FIG. 8 is an end view of the tow hitch shank sleeve and shank shaft taken along line 8-8 of FIG. 1.

A side view of the shank 12 and the shank shaft 14 is shown in FIG. 4. The shank shaft 14 extends outwardly from the second end 13 of shank 12 a sufficient length to accommodate the tubular shank sleeve 16. The shank shaft 14 is somewhat smaller that the shank 12 and is sized to accommodate shank sleeve 16. As shown in FIG. 8 the shank shaft 14 may be circular so that the shank sleeve 16 can be easily rotated around the longitudinal axis of the shank shaft. The shank shaft 14 has three pin locating holes that are located at 90° apart around the shaft for locating and maintaining the indexing pin in proper position, e.g., 17b, 17c, and a third pin locating hole (not shown) on the opposite side of the shank shaft 14 from hole 17c. Typically the locating hole is about ¼ inch deep and the diameter is sized to accommodate the plunder pin 54 of the indexing plunger 50. When the indexing plunger is released the plunger pin 54 extends into the locating hole and prevents the shaft sleeve 16 from rotating. The shank shaft 14 has a plurality of grease grooves 19a, 19b, and 19c located along the length of the shank shaft 14 to maintain lubrication between the shank shaft and the shank sleeve. As will be explained, the shank shaft 14 has a hole 41 through the shaft at its outer end, i.e., at the end opposite the shank 12.

Figure 6:
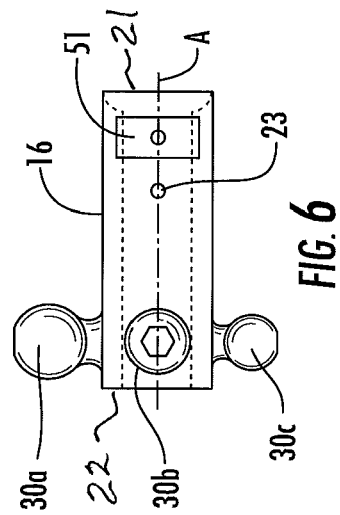
FIG. 6 is a top view of the shank sleeve of the tow hitch of the present invention showing the three tow ball assembly.

A side view of shank sleeve 16 is shown most clearly in FIG. 5 as having a tubular shape and sized to fit around shank shaft 14. The shank sleeve has a first end 21 and a second end 22. When in place over the shank shaft the first end 21 of shank sleeve 16 abuts the second end 13 of shank 12. The first end of shank sleeve 16 may be chamfered or beveled so as to form a tighter fit with the shank 12 which may also be chamfered or beveled. Tow balls 30a, 30b, and 30c are secured to respective side walls of tubular shank sleeve 16. As shown in FIG. 8, the tow balls each have a base 32a, 32b, and 32c and may be fastened to the shank sleeve 16 in a conventional manner, such as by welding each base of each ball to a respective side wall of the shank sleeve 16. FIG. 6 is the top view of shank sleeve 16 showing the tow balls 30a, 30b, 30c located near the second end 22 of shank sleeve 16. A grease port 23 is provided for supplying grease to each of the grease groves 19a, 19b, 19c. A mounting plate seat 51 for plunger 50 is provided on the top side of sleeve 16.

Figure 7:
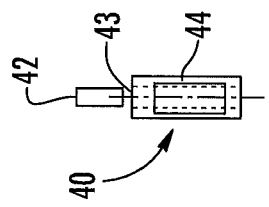
FIG. 7 is a side view of the tow hitch end cap used to secure the shank sleeve to the shank shaft.

One of the advantages of the present invention is the manner in which the shank sleeve 16 is retained on shank shaft 14. In FIG. 7 there is shown end cap 40 having an open space 44 sized to receive the outer end of shank shaft 14. End cap 40 has a pin 42 extending through an opening 43 in the end cap 40 from the top to the bottom. As stated previously, there is also an opening 41 through the end of the shank shaft 14. Shank shaft 14 is longer than shaft sleeve 16 by an amount that approximates the thickness of the end cap 40. When the end cap 40 is placed upon the shank shaft 14 that has the sleeve 16 placed thereon pin 42 is inserted through the opening 41 and opening 43 and fixed in place such as by welding to hold the shank sleeve in place. This allows the shank sleeve 16 to fit snugly over the shank shaft 14 and be capable of rotating around the longitudinal axis A of the shank shaft.

Figure 9:
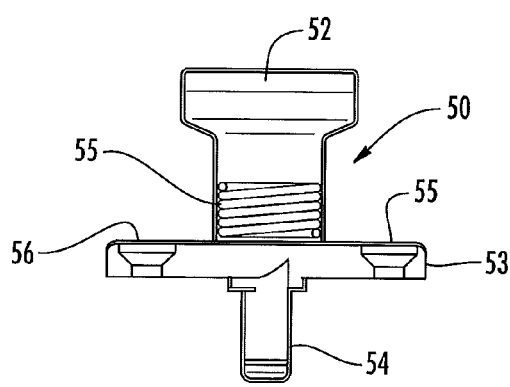
FIG. 9 is a side view of a preferred indexing plunder pin for use in the present invention.

Each tow ball is held in a desired position by spring loaded indexing plunger pin 50. An example of a suitable indexing plunger pin is shown in FIG. 9 wherein the plunger 50 has a mounting plate 53 which is seated in mounting plate seat 51 shown on the top side of sleeve 16 and held in place by screws 56. The plunger has a locating pin 54 that extends through a hole in the shank sleeve 16 and into the location holes in the shank shaft 14. The locating pin may be disengaged by outwardly extend the plunder by pulling on knob 52 which is biased against spring 55. It should be understood that while the use of an indexing plunger as described is a preferred means for locating and holding the sleeve in place, other means of locating are known to those skilled in the art.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A receiver-type tow hitch for coupling a trailer to a towing vehicle comprising;
- a shank having four sides surfaces, a first end and a second end adapted to slideably fit within a receiver located on a towing vehicle in a comparative snug, supported locked position;
- a shank shaft extending outwardly from said second end of said shank and having a longitudinal axis, said shank shaft being slightly smaller in cross section than said shank and having a means for locating a shank sleeve in a fixed position;
- said shank sleeve placed over said shank shaft, said shank sleeve having side walls and being capable of rotating around the longitudinal axis of said shank shaft;
- a plurality of tow balls secured to the side walls of said shank shaft sleeve;
- an end cap affixed to the end of said shank shaft for securing said shank sleeve to said shank shaft; and
- a means for locating said tow balls in said fixed position on said shank shaft.

2. The tow hitch according to claim 1 wherein said plurality of tow balls comprises three different size balls.

3. The tow hitch according to claim 1 wherein said shank has a square cross-section.

4. The tow hitch according to claim 1 wherein said shank shaft is circular.

5. The tow hitch according to claim 1 wherein said shank sleeve is tubular.

6. The tow hitch according to claim 1 wherein said means for locating is an indexing plunger pin.

7. The tow hitch according to claim 1 wherein said shank shaft has a series of indexing slots corresponding to each tow ball.

8. A receiver-type tow hitch for coupling a trailer to a towing vehicle comprising;
- an shank having four sides surfaces, a first end and a second end adapted to slideably fit within a receiver located on a towing vehicle in a comparative snug, supported locked position wherein said shank has a square cross-section;
- a circular shank shaft extending outwardly from said second end of said shank and having a horizontal axis, a tubular shank shaft being slightly smaller in cross section than said shank and having a means for locating a shank sleeve in a fixed position about the longitudinal axis of said shaft shank;
- said tubular shank sleeve placed over said shank shaft having side walls and be capable of rotating around the longitudinal axis of said shank shaft;
- three tow balls of different sizes secured to the side wall of said shank shaft sleeve;
- an end cap affixed to the end of said shank shaft for securing said shank sleeve to said shank shaft; and
- an indexing plunger pin for locating said tow balls in a fixed position in said shank shaft.

* * * * *